(12) United States Patent
Mische et al.

(10) Patent No.: US 10,491,036 B1
(45) Date of Patent: Nov. 26, 2019

(54) SOLID-STATE AUTOMATIC TRANSFER SWITCH

(71) Applicant: Amazon Technologies, Inc., Seattle, WA (US)

(72) Inventors: William Mische, Seattle, WA (US); Richard Arvel Stevens, Auburn, WA (US); Jared Joseph Lee, Mill Creek, WA (US); Mike MacGregor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 229 days.

(21) Appl. No.: 15/475,014

(22) Filed: Mar. 30, 2017

(51) Int. Cl.
    *H02J 9/06* (2006.01)
(52) U.S. Cl.
    CPC .................. *H02J 9/061* (2013.01)
(58) Field of Classification Search
    CPC ........ H02J 2009/068; H02J 9/061; H02J 9/06; H02J 9/04
    See application file for complete search history.

(56) References Cited

U.S. PATENT DOCUMENTS

| | | | | |
|---|---|---|---|---|
| 2003/0067343 | A1* | 4/2003 | Daun-Lindberg | H03K 17/735 327/460 |
| 2003/0080625 | A1* | 5/2003 | Malik | H02J 9/061 307/85 |
| 2004/0036362 | A1* | 2/2004 | Beck | H01H 21/42 307/125 |
| 2004/0080888 | A1* | 4/2004 | Gibbs | H02H 7/1257 361/87 |
| 2010/0013313 | A1* | 1/2010 | Groff | H02J 9/061 307/66 |
| 2010/0275441 | A1 | 11/2010 | Rasmussen et al. | |
| 2012/0086458 | A1 | 4/2012 | Wei et al. | |

OTHER PUBLICATIONS

"Battery Circuits for Stationary Applications Designed for the Long Haul," Matthew Theriault, Designer, Hindly Power Inc., Easton, PA, downloaded from http://www.battcon.com/PapersFinal2010/TheriaultPaper201OFinal_19.pdf, 2010, pp. 19-1 through 19-12.

(Continued)

*Primary Examiner* — Rexford N Barnie
*Assistant Examiner* — Thai H Tran
(74) *Attorney, Agent, or Firm* — Robert C. Kowert; Meyertons, Hood, Kivlin, Kowert & Goetzel, P.C.

(57) ABSTRACT

A solid-state automatic transfer switch includes a primary rectifier circuit and a secondary rectifier circuit, wherein at least one of the rectifier circuits includes one or more controllable semi-conductor switches. The primary rectifier circuit is electrically coupled to a primary input and an output of the solid-state automatic transfer switch. Also, the secondary rectifier circuit is electrically coupled to a secondary input of the solid-state automatic transfer switch and the output. A controller controls a control state of the controllable semi-conductor switches to allow or prevent electrical power from flowing through the primary or secondary rectifier circuits, thus selectively controlling whether power is fed from the primary input or the secondary input of the solid-state automatic transfer switch to the output of the solid-state automatic transfer switch.

20 Claims, 11 Drawing Sheets

(56) References Cited

OTHER PUBLICATIONS

HindlePower, "Best Battery Selector—Isolating Steering Diode Assembly for Redundant DB Power Systems," JF5048-00-Rev 1B, Jun. 18, 2015, pp. 1-4.
U.S. Appl. No. 14/934,056, filed Nov. 5, 2015, Peter George Ross, et al.
U.S. Appl. No. 14/656,356, filed Mar. 12, 2015, Peter George Ross, et al.

* cited by examiner

SOLID-STATE AUTOMATIC TRANSFER SWITCH

BACKGROUND

Some facilities include back-up components and systems to provide back-up power to electrical devices in the event of a failure of components or systems in a primary power system. In some facilities, each primary power system may have its own back-up system that is fully redundant at all levels of the power system. For example, in a data center having multiple server rooms, each server room may have its own primary power system and back-up power system. The back-up system for each server room may have a switchboard, uninterruptible power supply, and floor power distribution unit (PDU) that mirrors a corresponding switchboard, uninterruptible power supply, and floor power distribution unit in the primary power system for that server room. In other facilities, multiple primary power systems may be supported by a shared back-up system. For example, in a data center having multiple server rooms, each server room may have its own primary power system, but may share a reserve power system with one or more other ones of the server rooms.

Some facilities with primary power systems and back-up power systems include automatic transfer switches to switch between the primary and back-up power systems in case of a loss of power in one of the power systems. Such automatic transfer switches may include mechanical components, such as a mechanical switches, that require periodic testing and maintenance, thus adding to costs of operation. Also, some mechanical automatic transfer switches may fail to switchover or may be delayed in switching during a loss of power event thus adversely affecting operation of electrical devices, such as computer systems, receiving electrical power via the automatic transfer switches.

Figure 1:
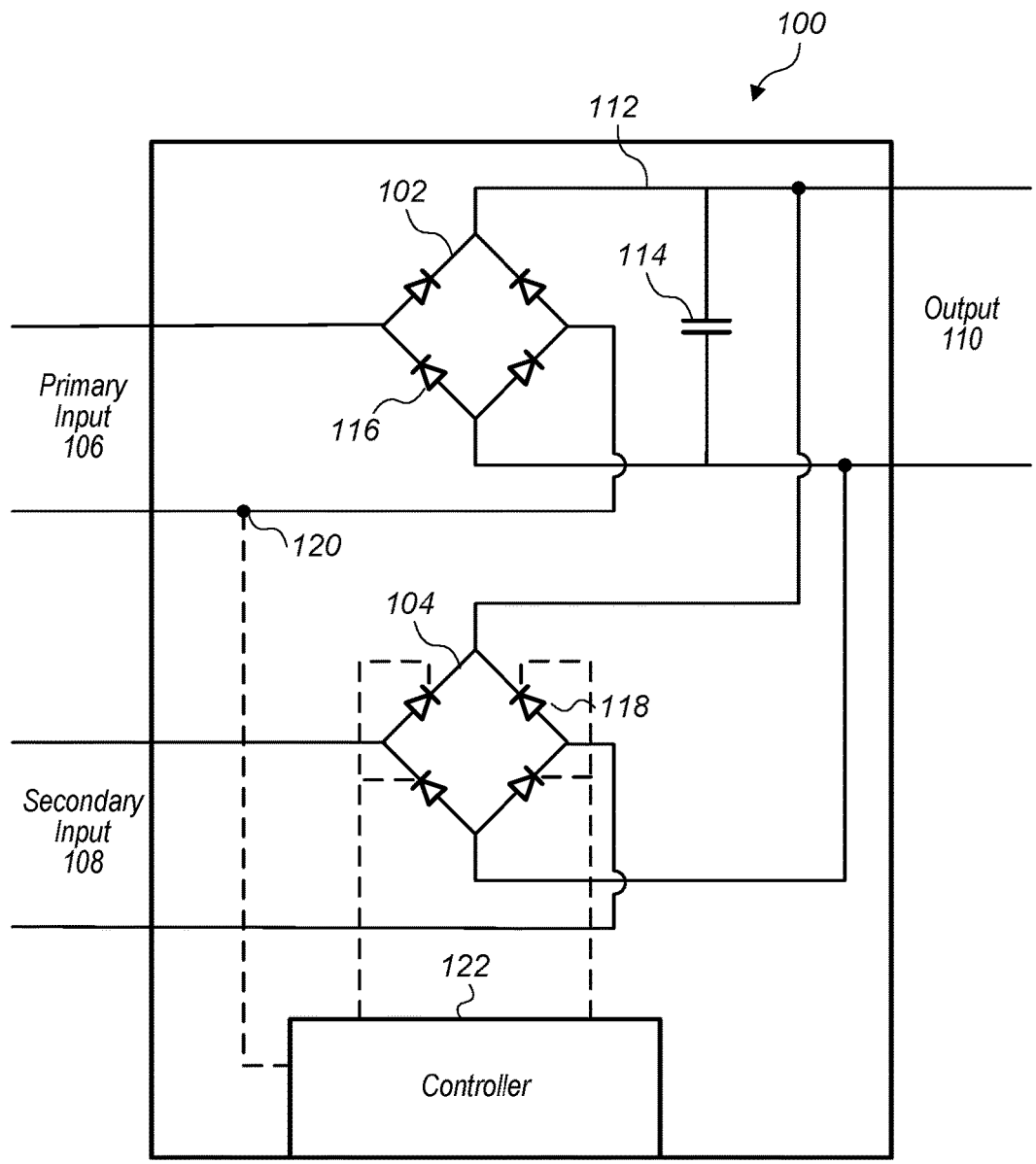
FIG. 1 is a schematic diagram illustrating a solid-state automatic transfer switch that includes controllable semiconductor switches in a secondary rectifier circuit, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a solid-state automatic transfer switch (ATS) are disclosed. According to one embodiment, a system, such as a data center power distribution system, includes a primary power system electrically coupled to a solid-state automatic transfer switch and configured to feed electrical power to a primary input of the solid-state automatic transfer switch from a primary power source. The system also includes a reserve power system electrically coupled to the solid-state automatic transfer switch and configured to feed electrical power to a secondary input of the solid-state automatic transfer switch from a reserve power source. The solid-state automatic transfer switch includes a primary rectifier circuit electrically coupled to the primary input and electrically coupled to an output of the solid-state automatic transfer switch and a secondary rectifier circuit electrically coupled to the secondary input and electrically coupled to the output of the solid-state automatic transfer switch. The primary rectifier circuit or the secondary rectifier circuit includes a controllable semi-conductor switch configured to selectively allow or prevent electrical power to flow through the controllable semi-conductor switch, based on a control state of the controllable semi-conductor switch. The system also includes an electrical load electrically coupled to the output of the solid-state automatic transfer switch. Also, the solid-state automatic transfer switch is configured to control the control state of the controllable semi-conductor switch to selectively feed electrical power to the electrical load from the primary power source or the reserve power source.

According to one embodiment, a solid-state automatic transfer switch includes a primary rectifier circuit electrically coupled to a primary input of the automatic transfer switch and a secondary rectifier circuit electrically coupled to a secondary input of the automatic transfer switch. The primary rectifier circuit or the secondary rectifier circuit includes a controllable semi-conductor switch configured to selectively allow or prevent electrical power to flow through the controllable semi-conductor switch, based on a control state of the controllable semi-conductor switch. Also, the automatic transfer switch is configured to control the control state of the controllable semi-conductor switch to selectively feed electrical power to an outlet of the automatic transfer switch from the primary input or from the secondary input.

According to one embodiment, a method includes feeding electrical power to a load coupled to an output of an automatic transfer switch from a primary power system coupled to a primary input of the automatic transfer switch, wherein the automatic transfer switch comprises a primary rectifier circuit electrically coupled to the primary input and a secondary rectifier circuit electrically coupled to a secondary input of the automatic transfer switch. The method further includes causing, in response to an interruption in electrical power from the primary power system, a controllable semi-conductor switch of the secondary rectifier circuit to change a control state of the controllable semi-conductor switch such that the controllable semi-conductor switch allows electrical power to flow through the controllable semi-conductor switch and feeding electrical power to the load coupled to the output of the automatic transfer switch from a reserve power system coupled to the secondary input of the automatic transfer switch. In some embodiments, the primary power source is turned "off" via a controllable semi-conductor switch of the primary rectifier circuit and the secondary primary power source is turned "on" via a controllable semi-conductor switch of the secondary rectifier circuit.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, providing electrical power "support", power feed support, etc. refers to providing one or more power feeds to be available to one or more downstream systems and components, including one or more electrical loads. Such provided power feeds may be precluded from being received by the systems and components but may be made available for receipt based at least in part upon a condition of one or more components upstream of the systems and components. For example, a reserve power system can provide reserve power support to an electrical load by providing a reserve power feed that can be selectively fed to the load by a solid-state automatic transfer switch that is downstream of the reserve power system and upstream of the load, where the solid-state automatic transfer switch may selectively feed power from the reserve power feed or a primary power feed to the load based at least in part upon one or more conditions associated with the primary power feed.

As used herein, providing "battery power support" refers to providing one or more power feeds to be available from one or more batteries to one or more downstream systems and components, including one or more electrical loads. Such battery feeds may be precluded from being received by the systems and components but may be made available for receipt based at least in part upon one or more conditions in the system. For example, a battery may provide battery power support to a group of electrical loads such that the battery is available to provide electrical power to the group of electrical loads and in the case of the group of electrical loads not receiving electrical power from other power sources, the group of electrical loads may receive electrical power from the battery.

As used herein, "primary power" means any power that can be supplied to an electrical load, for example, during normal operating conditions.

As used herein, "reserve power", "secondary power", etc. means power that can be supplied to an electrical load upon the failure of, or as a substitute for, primary power to the load.

As used herein, "computer system" or "computing device" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, one component in a power infrastructure is "downstream" from another component in the system if the one component receives power from the other component or is at a lower level in the system than the other component. For example, a data center may be downstream from a power plant.

As used herein, a "power feed" includes power from any source, including but not limited to power received from a utility power source that can be supplied to an electrical load. In some embodiments, a "power feed" may be received from the output of a transformer. For example, a low-voltage power feed received from a transformer may include low-voltage power received over a low-voltage power transmission line coupled to the transformer.

As used herein, "switchgear" includes electrical switching devices, fuses, circuit breakers, or combinations thereof used to isolate components in an electrical system. Switchgear can isolate downstream components from upstream power feeds. In some embodiments, switchgear isolates components to protect the equipment from electrical faults elsewhere in an electrical system. For example, switchgear in a computing facility may isolate various electrical and computing systems in the facility from upstream power feeds. In some embodiments, switchgear includes switching devices, fuses, circuit breakers, or combinations thereof used to switch between separate power sources.

As used herein, one component in a system is "upstream" from another component in the system if the one component supplies power to the other component or is at a higher level in the system than the other component. For example, an electrical substation supplying power to a data center may be upstream from the data center.

Some facilities may include automatic transfer switches that include mechanical components that cause power fed to downstream loads to automatically be switched between being fed from a primary power source and being fed from a secondary power source in response to a loss of power from the primary power source or from the secondary power source. However, such mechanical systems may fail or provide inadequate switching support due to problems related to the mechanical components. For example, a mechanical switch may corrode, deteriorate, stick, or break. Also, such mechanical systems may experience arcing wherein electrical power arcs between contacts of the mechanical switch while the mechanical switch is switching positions. Such arcing of the electrical power may further damage the switch and further reduce the reliability of a mechanical-based automatic transfer switch. Also, power being fed to downstream loads may be temporarily lost while a mechanical switch changes position. For example, for a short amount of time, a mechanical switch may not feed electrical power from a primary power source or a secondary power source while the mechanical switch is changing positions. In some facilities, even such short interruptions may adversely affect downstream loads. For example, in a data center, even a short interruption in electrical power may cause a downstream computing device, such as a server, to lose power and may necessitate re-starting of the server. This may cause an interruption to the data center's ability to serve customers.

In order to increase reliability of automatic transfer switches, a solid-state automatic transfer switch may provide the ability to automatically switch between a primary power source and a secondary power source without using mechanical components such as used in previous automatic transfer switches. For example, a solid-state automatic transfer switch may include a primary rectifier circuit and a secondary rectifier circuit. The solid-state automatic transfer switch may further include one or more controllable semi-conductor switches, such as a silicon controlled rectifier diode, in the primary rectifier circuit or in the secondary rectifier circuit, or in both. The controllable semi-conductor switch may allow a diode to be controlled such that in one control state electrical power is allowed to flow through the diode and in another control state electrical power is not allowed to flow through the diode. Thus, a solid-state automatic transfer switch that includes a rectifier circuit with a controllable semi-conductor switch may provide automatic switching capability between a primary power source and a secondary power source via one or more controllable semi-conductor switches without using mechanical components to perform the switching.

Furthermore, in some embodiments, direct current (DC) power may be fed from a solid-state automatic transfer switch to one or more downstream loads. Thus, once electrical power is converted from alternating current (AC) to direct current (DC) in a primary rectifier circuit or a secondary rectifier circuit of a solid-state automatic transfer switch, the DC power may be supplied to and consumed by downstream electrical devices without being converted back to AC power. In comparison, some other systems may include upstream uninterruptible power supplies (UPSs). However, in such systems, electrical power may be converted from alternating current (AC) to direct current (DC) at a UPS and may be subsequently converted back to AC power before leaving the UPS. The power may further be converted back to DC at one or more power supplies of an electrical device that consumes the electrical power. Thus the electrical power may be converted between AC and DC power multiple times. Also, each conversion may be less than 100% efficient so that some amount of power is lost when converting the power between AC and DC power. In contrast, a solid-state automatic transfer switch may feed DC power to downstream loads, such as computing devices, that consume the DC power without converting the power back to AC power. Additionally in some embodiments, because electrical power is fed from a solid-state automatic transfer switch as DC power, downstream components such as a power supply for one or more electrical devices may not include a rectifier circuit to convert AC power to DC power. This is because the power being fed from the solid-state automatic transfer switch may already be DC power.

In some embodiments, a solid-state automatic transfer switch may reduce an amount of time electrical power is fed from a UPS during a power interruption event or may eliminate the need to feed electrical power from a UPS during a power interruption event. Thus, one or more conversions from AC to DC and from DC to AC may be eliminated. Since there are power losses associated with each power conversion between AC and DC power, some such power losses may be eliminated when a solid-state automatic transfer switch is used to provide DC power to downstream electrical devices that consume the DC power. In some embodiments, an upstream UPS may also be included in a power system that includes a solid-state automatic transfer switch. Also, in some embodiments, a battery may be included in a solid-state automatic transfer switch or connected to a DC bus downstream of a solid-state automatic transfer switch. In some such embodiments, one or more upstream UPSs may be omitted from a power distribution system that includes a solid-state automatic transfer switch.

Furthermore, mechanical-based automatic transfer switches may require decisions as to whether or not to switch between a primary power source and a secondary power source to be made rapidly. This is because the mechanical switch changing positions may take more time to complete a switchover than a solid-state automatic transfer switch. Thus, mechanical-based automatic transfer switches may erroneously switch between a primary power source and a secondary power source in response to transient variations in power that are not necessarily indicative of a power interruption. However, a solid-state automatic transfer switch may execute a switchover between a primary and a secondary power source in a shorter amount of time than a mechanical-based automatic transfer switch. Because execution of a switchover requires less time in a solid-state automatic transfer switch, the solid-state automatic transfer switch may analyze disturbances in a primary or secondary power source for a longer duration of time than a mechanical-based automatic transfer switch before determining to switchover. In instances of momentary power blips, erroneous switchover events may be avoided.

In some embodiments, wherein a secondary or reserve power source provides reserve power support to multiple primary power systems, avoiding such erroneous switchovers may prevent overloading the reserve power system. For example, in some situations a power blip may occur due to an irregularity in a common upstream power source that feeds multiple primary power systems. In systems that rapidly determine whether or not to switchover, all or multiple automatic transfer switches, for example mechanical-based automatic transfer switches, may erroneously determine to switchover at the same time due to a false positive determination of a power interruption. In such situations the reserve power system may become overloaded due to all or multiple primary power systems being simultaneously switched over to a shared reserve power system. However, a solid-state automatic transfer switch may monitor the primary power system for a longer duration and avoid erroneously performing a switchover due to a power blip. Thus avoiding overload of the reserve power system. In some embodiments, an over-subscribed reserve power system, e.g. a reserve power system that supports multiple primary power systems, but has insufficient reserve capacity to support all the primary power systems at the same time, may be less expensive to install and operate than multiple reserve power systems wherein each primary power system has a corresponding reserve power system.

In some embodiments, a data center may include multiple groups of electrical loads, such as rack mounted computer systems, network switches, air moving devices, etc. In addition, some data centers may provide battery power support to several groups of electrical loads that share the same primary power system and the same reserve power system. In such data centers, the primary power system may include a single upstream uninterruptible power supply and the reserve power system may include a single upstream uninterruptible power supply. When one of the single upstream uninterruptible power supplies in the primary power system or the reserve power system fails, multiple groups of electrical loads in the data center may lose battery power support and/or electrical power support. In contrast, data centers that include solid-state automatic transfer switches with batteries (or downstream batteries) that each provide electrical power support to separate groups of electrical loads may have affected zones that are limited to a single group of electrical loads. For example an affected zone may include a single rack or a partial rack comprising rack mounted computer systems. Thus an affected zone affected by a failure of a battery associated with a solid-state automatic transfer switch may include fewer rack computer systems than a failure of an upstream uninterruptible power supply in data centers that provide electrical power support to several groups of electrical loads via a single uninterruptible power supply in an upstream power system.

FIG. 1 is a schematic diagram illustrating a solid-state automatic transfer switch that includes controllable semi-conductor switches in a secondary rectifier circuit, according to some embodiments.

A solid-state automatic transfer switch may include multiple rectifier circuits that are fed from different power sources. The multiple rectifier circuits may be coupled to a common output of the solid state automatic transfer switch via a DC bus. For example, solid-state automatic transfer switch 100 includes primary rectifier circuit 102 electrically coupled to primary input 106. Primary rectifier circuit 102 is also electrically coupled to output 110 via DC bus 112. Solid-state automatic transfer switch 100 also includes secondary rectifier circuit 104 electrically coupled to secondary input 108 and electrically coupled to output 110 via DC bus 112. In some embodiments, a solid-state automatic transfer switch may further include a capacitor coupled to a DC bus situated between rectifier circuits of the solid-state automatic transfer switch and an outlet of the solid-state automatic transfer switch. For example, automatic transfer switch 100 includes capacitor 114 coupled to DC bus 112. A capacitor, such as capacitor 114, may smooth out variations in output voltage from a solid-state automatic transfer switch that would otherwise be caused by variations in alternating current voltages as the AC power cycles between voltage peaks.

A rectifier circuit of a solid-state automatic transfer switch may include diodes arranged in a configuration to convert alternating current (AC) power into direct current (DC) power. "Diodes" as referred to herein may be interchangeably used with the term "rectifier." For simplicity of explanation diodes are referred to herein as being included in a rectifier circuit. However, the use of the term diode as opposed to the term rectifier is not intended to imply any particular voltage or power level application.

For example, primary rectifier circuit 102 includes diodes 116 arranged in a full wave rectifier or bridge rectifier arrangement. Also, in some embodiments at least some of the diodes included in a rectifier circuit of a solid-state automatic transfer switch may be controllable semi-conductor switches or may include controllable semi-conductor switches. For example a diode may include a controllable semi-conductor switch such as a silicon controlled rectifier (SCR), a silicon controlled-switch (SCS), a triode for alternating current (TRIAC), an insulated-gate bipolar transistor (IGBT), a metal-oxide-semiconductor field-effect transistor (MOSFET), or another suitable controllable solid-state element that is configured to prevent or allow current to flow through the solid-state element based on a control state of the solid-state element. In some embodiments, a semi-conductor switch may itself function as both a switch and a diode. For example a semi-conductor switch may allow and prevent power to flow through the switch such that the semi-conductor switch along with other elements of a rectifier circuit converts AC power into DC power. In some embodiments, a semi-conductor switch may include additional functionality such as is included in a diode that is biased to only allow current to flow in one direction.

Secondary rectifier circuit 104 includes controllable semi-conductor switches 118. In some embodiments, controllable semi-conductor switches 118 may include SCRs or may include a SCS, TRIAC, IGBT, or MOSFET or other type of transistor. Note that while FIG. 1 illustrates a full-wave rectifier, in some embodiments a solid-state automatic transfer switch may include a half-wave rectifier, or other suitable type of rectifier that includes at least one controllable semi-conductor switch. In some embodiments, a rectifier used in a solid-state automatic transfer switch may be configured to rectify multi-phase power, for example 3-phase power. Also, in some embodiments, a solid-state automatic transfer switch may include multiple rectifier circuits for each input. For example, in some embodiments, a solid-state automatic transfer switch may include three, four, or more inputs. Also, in some embodiments, a rectifier circuit of a solid-state automatic transfer switch may include multiple legs. For example, a rectifier circuit of a solid-state automatic transfer switch may include any number of legs per rectifier circuit to rectify multiple pulses, e.g. a rectifier circuit may include 12 legs for 12 pulse rectification. Such embodiments that include multiple legs, may further reduce variations in DC output voltage.

In some embodiments, a solid-state automatic transfer switch may further include a controller configured to monitor power supplied to a primary input and/or secondary input of the solid-state automatic transfer switch. The controller may further be configured to cause the automatic transfer switch to selectively switch between feeding electrical power to an output of the solid-state automatic transfer switch from the primary input or the secondary input. For example, a controller may detect an interruption in power supplied to a primary input of a solid-state automatic transfer switch and cause the solid-state automatic transfer switch to switchover to feed electrical power from a secondary input of the automatic transfer switch. For example, controller 122 may detect an interruption in power received at primary input 106 via connection 120 to primary input 106. In response to detecting the interruption in power received at primary input 106, the controller 122 may cause controllable semi-conductor switches 118 of secondary rectifier circuit 104 to change a control state of the controllable semi-conductor switches 118 from a control state that does not allow electrical power to flow through the controllable semi-conductor switches 118 to a control state that does allow electrical power to flow through the controllable semi-conductor switches 118. Thus, in response to an interruption in electrical power being received at primary input 106, a solid-state automatic transfer switch may switchover to feed electrical power from a secondary input, such as secondary input 108. It should be noted that the switching is performed without use of a mechanical switch. Instead solid-state components such as controllable semi-conductor switches are used to perform the switching. Thus, a solid-state automatic transfer switch may avoid many of the reliability issues related to mechanical components. Furthermore, execution of a switchover may be performed in less time than is required for mechanical switches to execute a switchover.

In some embodiments, a controller such as controller 122, may be implemented in hardware or software. For example in some embodiments a controller, such as controller may be implemented in software executing in a computing device included in a solid-state automatic transfer switch or may be implemented via hardware in a logical circuit.

In some embodiments, a solid-state automatic transfer switch, such as automatic transfer switch 100, may be further configured to automatically switch back to feeding electrical power from a primary power source, such as from primary input 106, when electrical power is restored following a power interruption event. For example, controller 122, may continue to monitor electrical power at primary input 106 via connection 120 while feeding electrical power from secondary input 108. In response to determining electrical power has been restored at primary input 106, controller 122 may cause controllable semi-conductor switches 118 in secondary rectifier circuit 104 to change a control state from a control state that allows electrical power to flow through the controllable semi-conductor switches to a control state that prevents electrical power form flowing through the controllable semi-conductor switches. By preventing electrical power from flowing through controllable semi-conductor switches 118 of secondary rectifier circuit 104, electrical power is prevented from flowing to output 110 from secondary input 108 and instead flows to output 110 from primary input 106.

Figure 2:
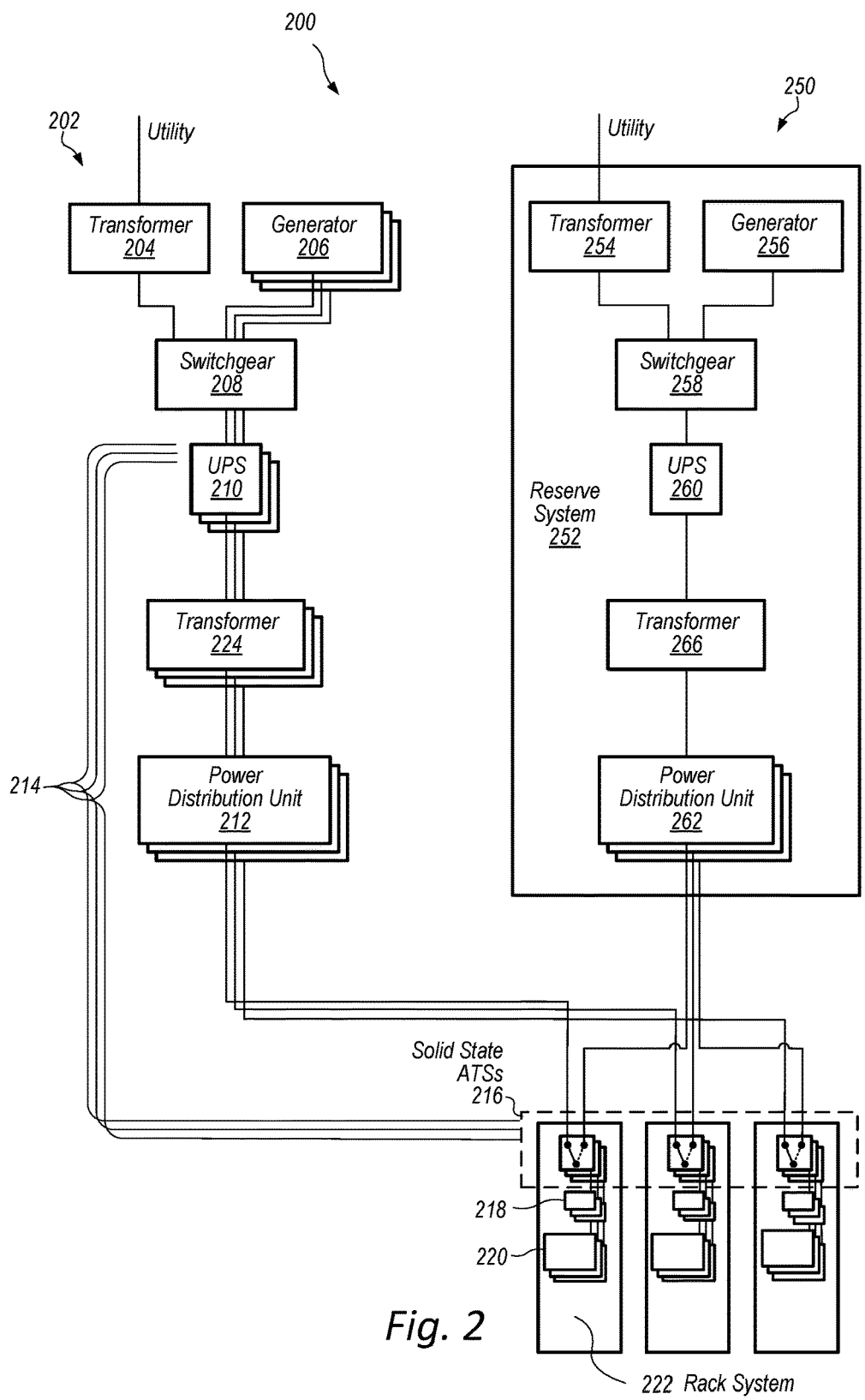
FIG. 2 is a block diagram illustrating a power distribution system that includes solid-state automatic transfer switches providing electrical power support to loads in a data center, according to some embodiments.

FIG. 2 is a block diagram illustrating a power distribution system that includes solid-state automatic transfer switches providing electrical power support to loads in a data center, according to some embodiments.

FIG. 2 illustrates an example data center that may include a solid-state automatic transfer switch 100 as described in regard to FIG. 1. Data center 200 includes racks 222, primary power side 202 and reserve power side 250. Reserve power side 250 includes reserve power system 252. Data center 200 shown in FIG. 2, includes solid-state automatic transfer switches 216 electrically coupled to primary power side 202 and reserve power side 250. Solid-state automatic transfer switches 216 may be any of the solid-state automatic transfer switches illustrated in FIGS. 1 and 3-7 or described in FIGS. 8-11.

Primary power side 202 includes transformer 204, generators 206, and switchgear 208, and primary power systems 214. Sets of computer systems 220 in racks 222 may perform computing operations in data center 200. Computer systems 220 may be, for example, servers in a server room of data center 200. Computer systems 220 in racks 222 may each receive power from one of primary power systems 214. In one embodiment, each of primary power systems 214 corresponds to, and provides power to, the servers in one room in data center 200. In one embodiment, each of primary power systems 214 may correspond to, and provides power to, one half or one third of a rack system in data center 200.

Primary power systems 214 each include floor power distribution units 212 that provide power to various racks 222. In some embodiments, floor power distribution units 212 include transformers that transform the voltage from switchgear 208. Each of racks 222 may include one or more power supplies 218. Power supplies 218 may convert medium voltage DC current from solid-state automatic transfer switches 216 to a lower voltage DC power that is distributed to computer systems 220.

Transformer 204 is coupled to a utility feed. The utility feed may be a medium voltage feed. In certain embodiments, the utility feed is at a voltage of about 13.5 kilovolts or 12.8 kilovolts at a frequency of about 60 Hz. Generators 206 may provide power to primary power systems 214 in the event of a failure of utility power to transformer 204. In one embodiment, one of generators 206 provides back-up power for each of primary power systems 214.

Reserve power system 252 may provide reserve power for all of the computer systems 220 supplied by primary power systems 214. In some embodiments, reserve power system 252 is powered up at all times during operation of data center 200. Reserve power system 252 may be passive until a failure of one or more components of primary power side 202, at which time reserve power system 252 may become active.

For illustrative purposes, three primary power systems are shown in FIG. 2 (for clarity, details of only the front primary power system 214 are shown). The number of primary power systems 214 on primary power side 202 may vary, however. In certain embodiments, a primary power side may include only one primary power system. In addition, the number of power distribution units, switchgear apparatus may vary from embodiment to embodiment (and, within a given embodiment, from system to system). In some embodiments, primary power system 214 includes many floor power distribution units 212.

Reserve power system 252 includes transformer 254 and generator 256. Transformer 254 may supply power to switchgear 258. Floor power distribution unit 262 may receive power from switchgear 258.

Primary power system 214 includes isolation transformer 224 and reserve power system 252 includes isolation transformer 266. Isolation transformers 224 and 266 may isolate downstream loads such as computer systems 220 from noise or harmonics in primary power systems 214 and reserve power system 252.

In some embodiments, a solid-state automatic transfer switch may include one or more batteries, or a common DC power bus electrically coupled to a solid-state automatic transfer switch may include one or more batteries coupled to the DC power bus. In such arrangements, electrical battery support may be provided by a downstream solid-state automatic transfer switch or a battery coupled to a DC output of a solid-state automatic transfer switch and upstream uninterruptible power supplies may not be included in a power distribution system. For example, UPSs 210 and 260 may not be included in primary power system 214 and reserve power system 252.

Figure 3:
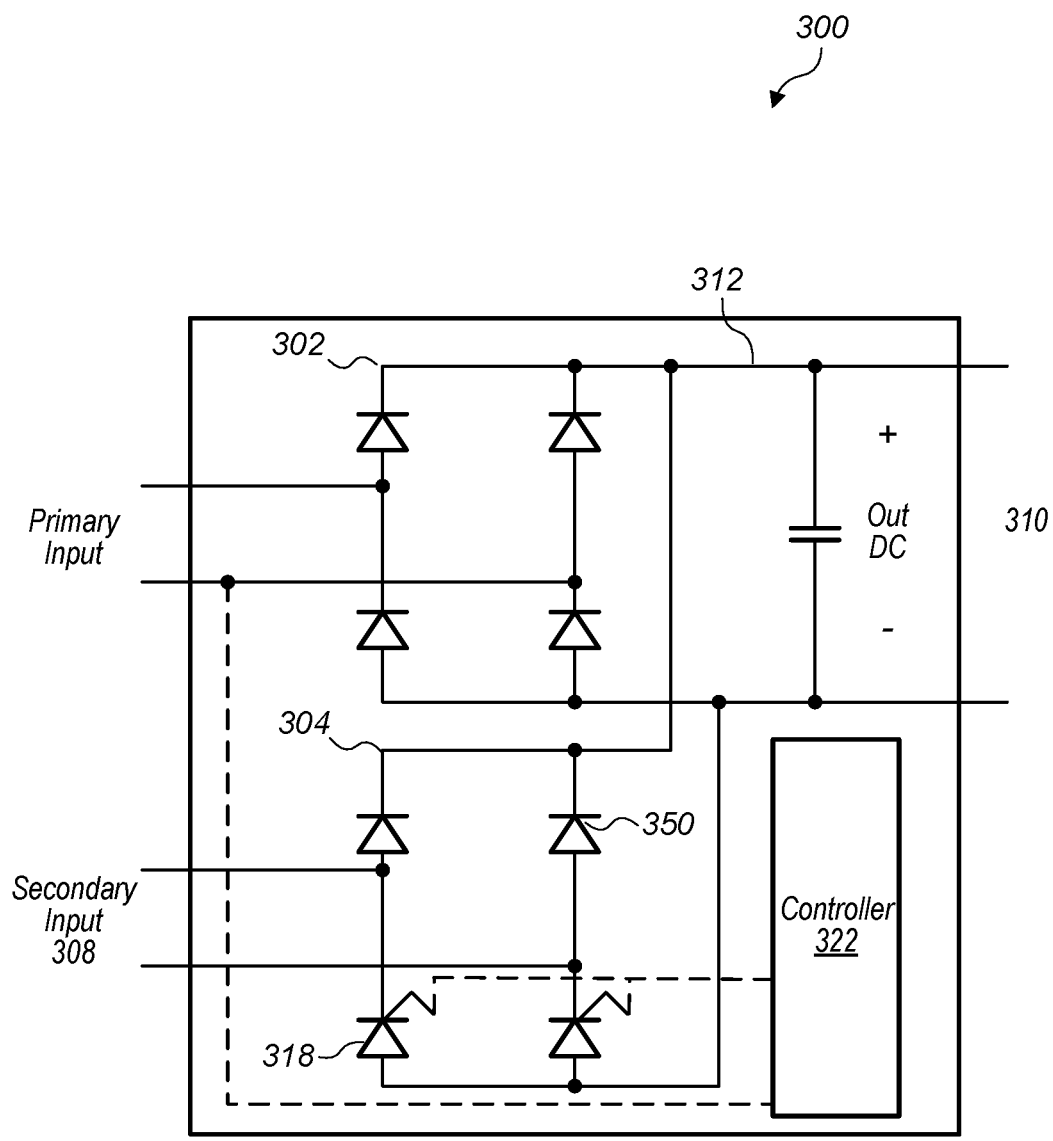
FIG. 3 is a schematic diagram illustrating a solid-state automatic transfer switch that includes controllable semiconductor switches and non-controllable diodes in a secondary rectifier circuit, according to some embodiments.

In some embodiments, a solid-state automatic transfer switch may include both controllable and non-controllable diodes in a secondary rectifier circuit. For example, FIG. 3 is a schematic diagram illustrating a solid-state automatic transfer switch that includes controllable semi-conductor switches and non-controllable diodes in a secondary rectifier circuit, according to some embodiments. Solid-state automatic transfer switch 300 includes primary rectifier circuit 302 and secondary rectifier circuit 304 coupled to output 310 in a similar manner as illustrated in FIG. 1. However, secondary rectifier circuit 304 includes controllable semi-conductor switches 318, which may be similar to controllable semi-conductor switches 118 described in regard to FIG. 1, and also non-controllable diodes 350. Because controllable semi-conductor switches 318 are located in both branches of secondary rectifier circuit 304 that connect to one of the terminals of DC bus 312 and output 310, controlling the controllable semi-conductor switches in a control state that prevents electric current from flowing through the controllable semi-conductor switches 318 prevents current from flowing from secondary input 308 to output 310 via secondary rectifier circuit 304. Also, when the controllable semi-conductor switches 318 are controlled in a control state that allows electrical power to flow through the controllable semi-conductor switches 318, electrical power can flow from secondary input 308 to output 310 via secondary rectifier circuit 304. In some embodiments, a controllable semi-conductor switch may have a slightly higher electrical loss than a non-controllable diode. Thus, by reducing the number of controllable semi-conductor switches included in a secondary rectifier circuit, an overall efficiency of a solid-state automatic transfer switch when feeding electrical power from a secondary power source may be increased by eliminating additional losses caused by controllable semi-conductor switches as compared to non-controllable diodes.

Figure 4:
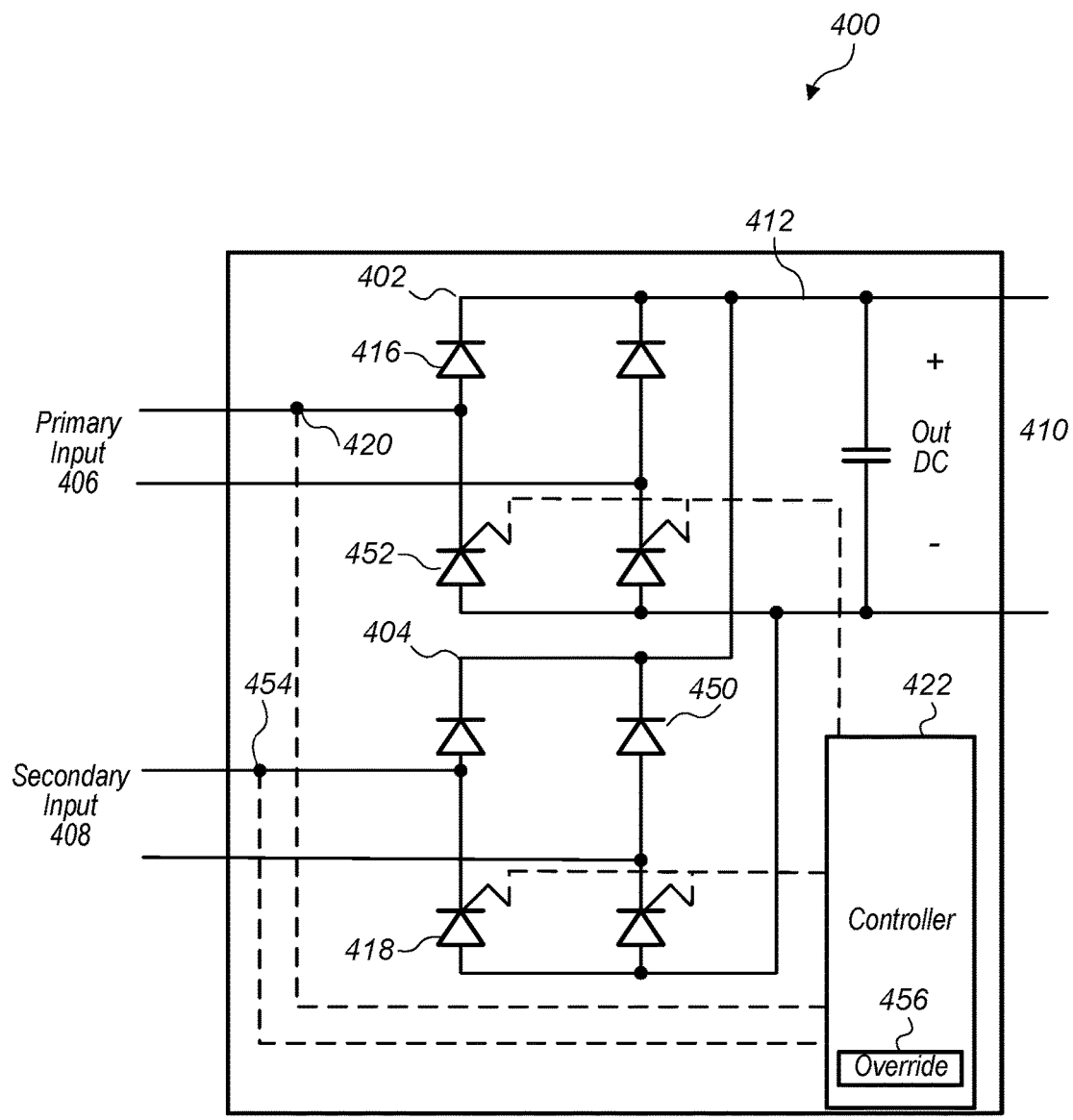
FIG. 4 is a schematic diagram illustrating a solid-state automatic transfer switch that includes controllable semiconductor switches in a primary rectifier circuit and a secondary rectifier circuit, according to some embodiments.

In some embodiments, a solid-state automatic transfer switch may further include controllable semi-conductor switches in a primary rectifier circuit. For example, FIG. 4 is a schematic diagram illustrating a solid-state automatic transfer switch that includes controllable semi-conductor switches in a primary rectifier circuit and a secondary rectifier circuit, according to some embodiments. Solid-state automatic transfer switch 400 includes primary rectifier circuit 402 and secondary rectifier circuit 404. Primary rectifier circuit 402 is electrically coupled to primary input 406 and output 410 via DC bus 412. Secondary rectifier circuit 404 is electrically coupled to secondary input 408 and output 410 via DC bus 412. Secondary rectifier circuit 404 includes controllable semi-conductor switches 418 and non-controllable diodes 450 arranged in a similar manner as secondary rectifier circuit 304 illustrated in FIG. 3. Primary rectifier circuit 402 includes non-controllable diodes 416 and controllable semi-conductor switches 452. Controller 422 is configured to monitor electrical power at primary input 406 via connection 420 and to monitor electrical power at secondary input 408 via connection 454. A controller, such as controller 422, may in some embodiments, cause a solid-state automatic transfer switch to continue to feed electrical power from a secondary input, such as secondary input 408, even after electrical power has been restored to a primary input, such as primary input 406, following a power interruption event. Also, in some embodiments, a controller, such as controller 422 may cause an automatic transfer switch, such as automatic transfer switch 400, to automatically switch back to primary power after determining power has been restored at a primary power input, such as primary input 406. In embodiments, in which a controller, such as controller 422, causes the solid-state automatic transfer switch to stay on secondary power following restoration of power at a primary power input, the controller may monitor the secondary power via a connection, such as connection 454, and upon detecting an interruption in power received at a secondary input, such as secondary input 408, cause the automatic transfer switch to instead feed electrical power from a primary input, such as primary input 406.

In some embodiments, a solid-state automatic transfer switch may further include an override feature that causes the automatic transfer switch to switch to feed from a different one of the primary input or the secondary input despite no power interruption event being detected at a primary input or a secondary input of the solid-state automatic transfer switch. In some embodiments, an override, such as override 456 may be a button, knob, switch, keypad, or other type of interface on the solid-state automatic transfer switch that allows a user to cause the solid-state automatic transfer switch to switch feeds despite no power interruption event being detected. In some embodiments, an override, such as override 456 may be operated remotely. For example, an override may receive a signal from a common control system at a facility. In some embodiments, an override may be configured to receive a wireless signal indicating that the solid-state automatic transfer switch is to switch power feeds despite no power interruption event being detected. In some embodiments, a controller, such as controller 422, may verify that electrical power is available at a power input before switching to the power input in response to an override command. For example, when feeding electrical power from primary input 406, a controller, such as controller 422, may verify that electrical power is available from secondary input 408 before switching to feed electrical power from secondary input 408.

In some embodiments, controllable semi-conductor switches included in a primary rectifier circuit may be used to cause a solid-state automatic transfer switch to switch to a secondary power input and to feed electrical power via a secondary rectifier circuit. For example, controllable semi-conductor switches 452 may prevent electrical power from flowing through primary rectifier circuit 402. Also slightly after causing controllable semi-conductor switches 452 to prevent power flow through primary rectifier circuit 402, a controller of a solid-state automatic transfer switch, such as controller 422, may cause controllable semi-conductor switches of a secondary rectifier circuit, for example controllable semi-conductor switches 418 of secondary rectifier circuit 404 to allow electrical power to flow through secondary rectifier circuit 404 from secondary input 408 to output 410.

Figure 5:
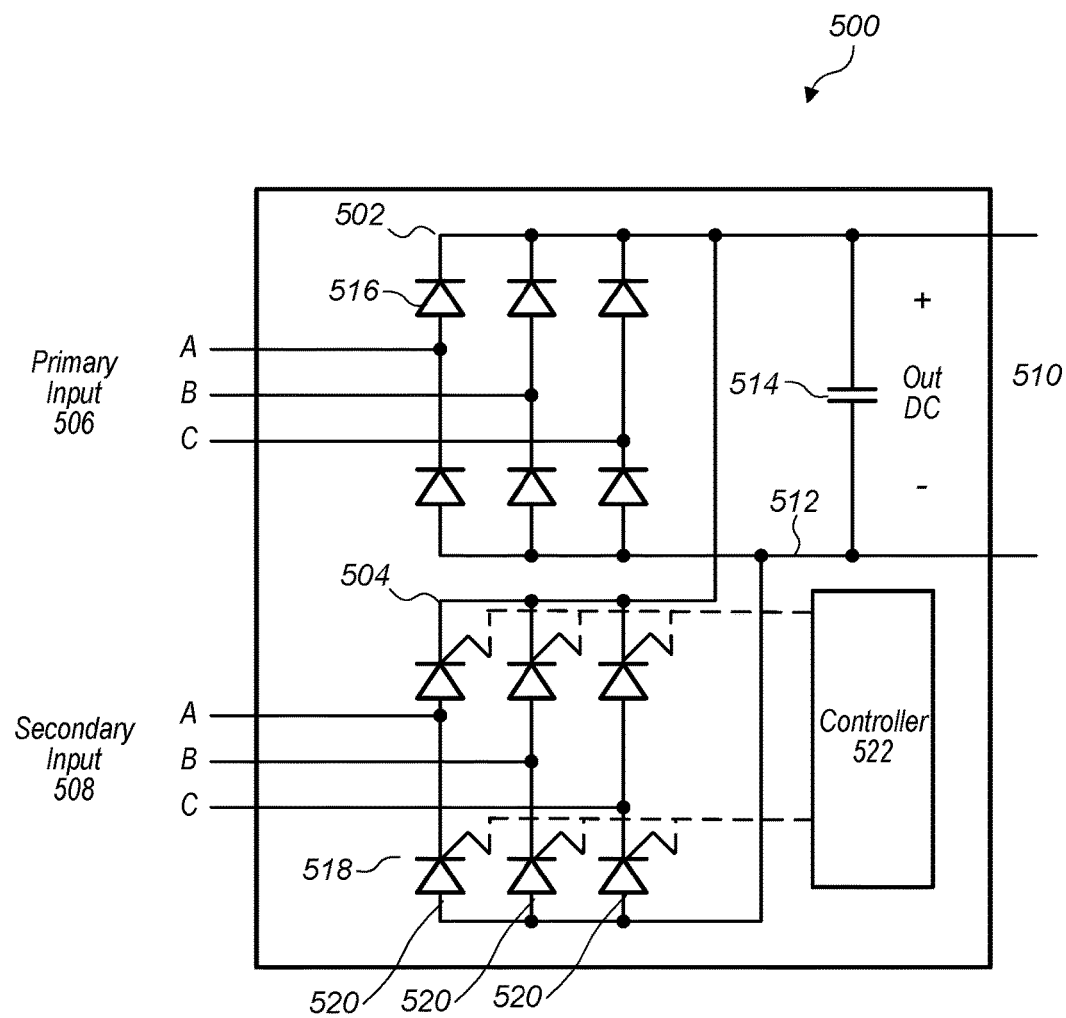
FIG. 5 is a schematic diagram illustrating a solid-state automatic transfer switch that includes controllable semiconductor switches in a three-phase secondary rectifier circuit, according to some embodiments.

In some embodiments a solid-state automatic transfer switch may be configured to receive three-phase electrical power. For example FIG. 5 is a schematic diagram illustrating a solid-state automatic transfer switch that includes controllable semi-conductor switches in a three-phase secondary rectifier circuit, according to some embodiments. Note that in some embodiments, a primary or secondary rectifier circuit may be configured to rectify any number of phases of power. For example, in some embodiments, additional or fewer legs, such as additional or fewer legs 520 may be included in a rectifier circuit to rectify additional or fewer phases of power.

Solid-state automatic transfer switch 500 includes three-phase primary input 506 and three-phase secondary input 508. Solid-state automatic transfer switch 500 also includes primary rectifier circuit 502 and secondary rectifier circuit 504. Both primary rectifier circuit 502 and secondary rectifier circuit 504 are electrically coupled to output 510 via DC bus 512 that includes capacitor 514. Primary rectifier circuit 502 includes six diodes 516 in three legs 520, three connected to a positive terminal of DC bus 512 and three connected to a negative terminal of DC bus 512. Secondary rectifier circuit 504 also includes six diodes in three legs, wherein three diodes are connected to a positive terminal of DC bus 512 and three diodes are connected to a negative terminal of DC bus 512. However, in secondary rectifier circuit 504, the diodes are or include controllable semiconductor switches 518. A controller in a solid-state automatic transfer switch configured to receive three-phase power, may function in a similar manner as a controller described in regard to FIGS. 1-3. For example, controller 522 may function in a similar manner as controllers 122, 322, or 422. In some embodiments, a three-phase solid-state automatic transfer switch may include all controllable semiconductor switches in a secondary rectifier circuit as shown in FIG. 5, The controllable semi-conductor switches may be arranged in a similar arrangement as shown in FIG. 1, but may be configured to receive and rectify three-phase power. Also, in some embodiments, a three-phase solid-state automatic transfer switch may include controllable semiconductor switches and non-controllable diodes in a secondary rectifier circuit. For example, a three-phase solid-state automatic transfer switch may include controllable semiconductor switches and non-controllable diodes in a similar arrangement as shown in FIG. 3, but may be configured to receive and rectify three-phase power. Also, in some embodiments, a three-phase solid-state automatic transfer switch may include controllable semi-conductor switches and non-controllable diodes in a primary rectifier circuit and a secondary rectifier circuit. For example, a three-phase solid-state automatic transfer switch may include controllable semi-conductor switches and non-controllable diodes in a similar arrangement as shown in FIG. 4, but may be configured to receive and rectify three-phase power.

Figure 6:
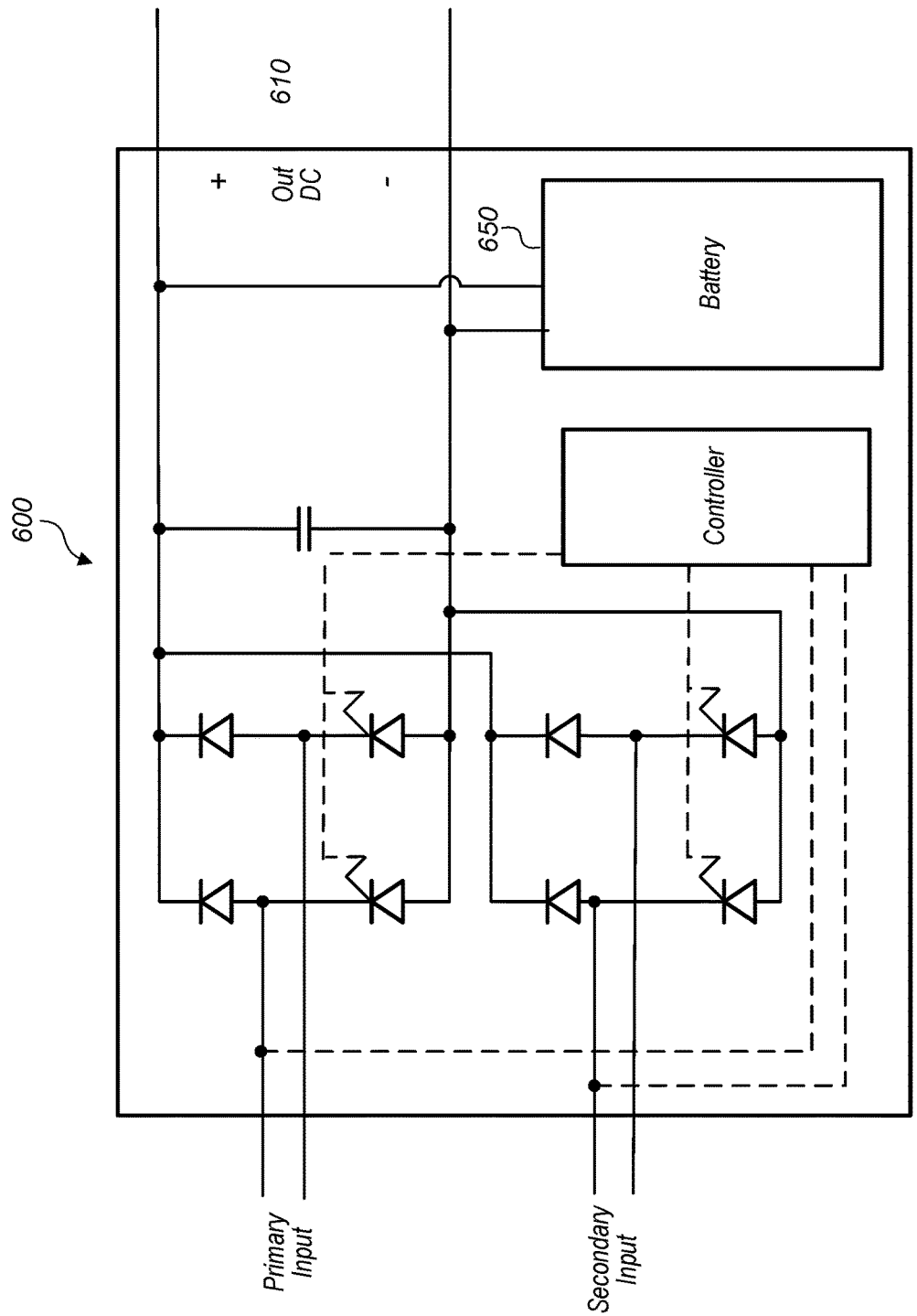
FIG. 6 is a schematic diagram illustrating a solid-state automatic transfer switch that includes a battery, according to some embodiments.

In some embodiments, a solid-state automatic transfer switch may further include a reserve power source such as a battery, supercapacitor, or other suitable reserve power source. For example, FIG. 6 is a schematic diagram illustrating a solid-state automatic transfer switch that includes a battery, according to some embodiments. Solid-state automatic transfer switch 600 includes battery 650 electrically coupled to output 610. A battery such as battery 650 may be included in any of the solid-state automatic transfer switches described in FIGS. 1-5 and 7-11.

Figure 7:
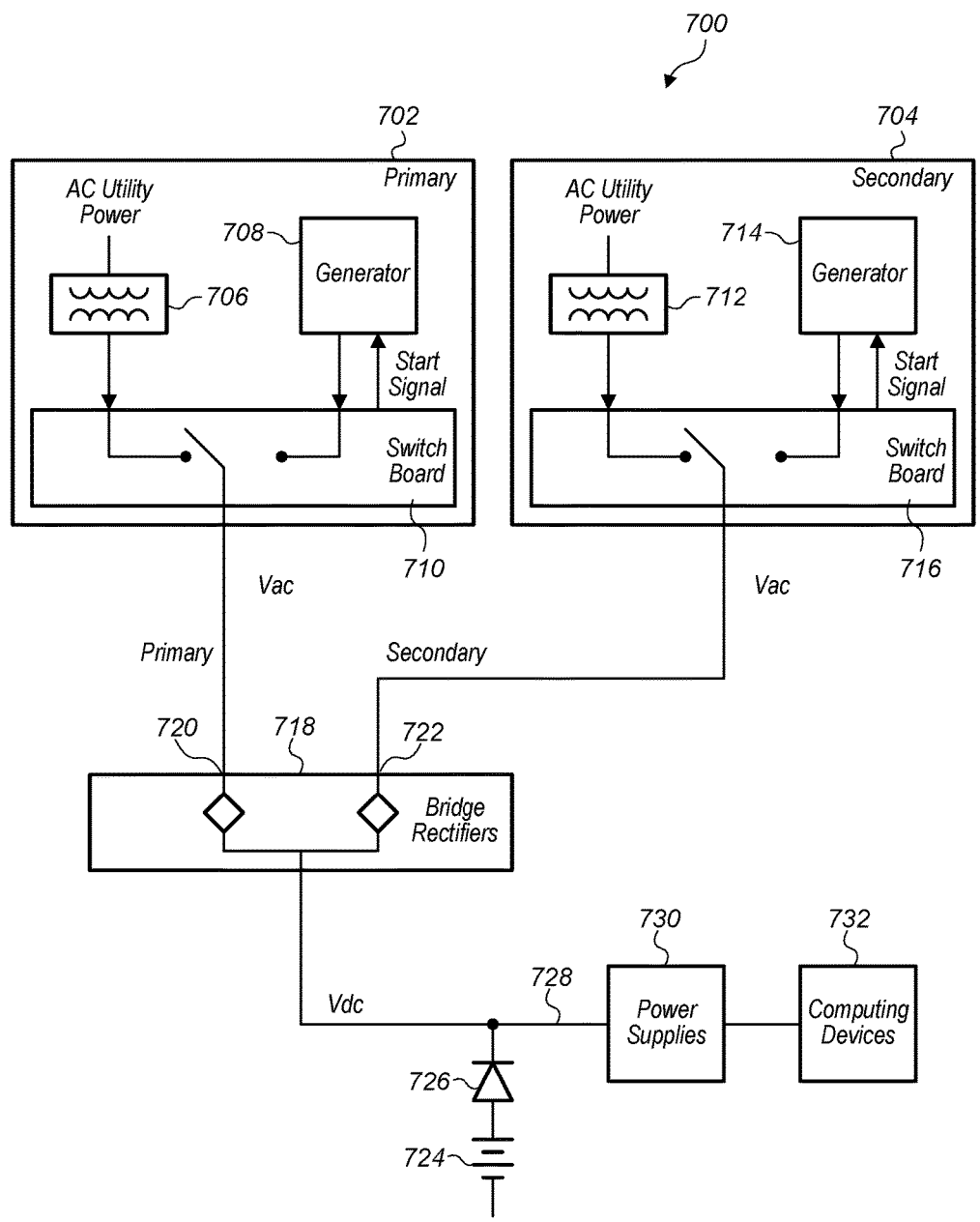
FIG. 7 is a block diagram illustrating a power distribution system that includes a solid-state automatic transfer switch and a downstream battery providing electrical power support to electrical loads, according to some embodiments.

In some embodiments, a battery may be coupled to a DC power distribution bus downstream of a solid-state automatic transfer switch. For example, FIG. 7 is a block diagram illustrating a power distribution system that includes a solid-state automatic transfer switch and a downstream battery providing electrical power support to electrical loads, according to some embodiments.

Facility 700 includes primary power system 702 and secondary power system 704.

Primary power system 702 includes transformer 706 coupled to a primary power source, such as a utility power provider, power plant, etc. Primary power system 702 also includes generator 708. Generator 708 and transformer 706 are coupled to switchboard 710 configured to cause generator 708 to start and to switch power being fed between being fed from transformer 706 and generator 708. In a similar manner, secondary power system 704 includes transformer 712 coupled to a secondary power source, such as a different utility power system, a different power plant, etc.

Secondary power system also includes generator 714 and switchboard 716. In some embodiments, a secondary power system may not include a connection to a secondary power source and may instead only include generator 714. In some embodiments, a primary power system or a secondary power system may feed alternating current power at a voltage at or about 480 volts to a solid-state automatic transfer switch. For example, primary power system 702 and secondary power system 704 feed electrical power to a primary input 720 of solid-state automatic transfer switch 718 and secondary input 722 of solid-state automatic transfer switch 718. Solid-state automatic transfer switch 718 may be any of the solid-state automatic transfer switches described in FIGS. 1-6 and 8-11. In some embodiments, a solid-state automatic transfer switch, such as solid-state automatic transfer switch 718 may feed high-voltage DC power at a voltage corresponding to the rectified AC power to downstream loads. In some embodiments, a reserve power source, such as a battery, supercapacitor, or other suitable reserve power source, may be coupled to a high-voltage DC distribution system downstream of a solid-state automatic transfer switch. For example battery 724 is connected via diode 726 to high-voltage DC distribution system 728. In some embodiments, power supplies and electronic devices, such as computing devices may receive electrical power from a high-voltage DC distribution system downstream of a solid-state automatic transfer switch. For example, power supply 730 transforms high-voltage DC power from high-voltage DC distribution system 728 to low voltage DC power, for example at or about 1.2 volts, that is consumed by computing devices 732. Note that the voltages given above are examples. In some embodiments a primary power system and a secondary power system may provide alternating current power at different voltages to a solid-state automatic transfer switch. Also, the solid-state automatic transfer switch may provide direct current power at different voltages to downstream loads.

In some embodiments, a power supply that transforms high-voltage DC power to lower voltage DC power, such as power supply 730 may be included in a solid-state automatic transfer switch, such as solid-state automatic transfer switch 718. In such embodiments, the DC to DC power supply may be located downstream of the primary and secondary rectifier circuits of the solid-state automatic transfer switch. Also, in some embodiments, a power supply, such as power supply 730, may be adjacent to a solid-state automatic transfer switch. For example, in some embodiments, battery 724 and diode 726 may be included in solid-state automatic transfer switch 718 and power supply 730 may be coupled to an output of solid-state automatic transfer switch 718. Furthermore, in some embodiments, power supply 730 may be combined with solid-state automatic transfer switch 718, such that the solid state automatic transfer switch provides both automatic transfer switch functionality and power supply functionality.

In FIGS. 1-7 various combinations have been described. However, in some embodiments features described in any one of FIGS. 1-7 may be combined with other features described in FIGS. 1-7. For example, in some embodiments any rectifier circuit of a solid-state automatic transfer switch may be controllable or non-controllable. Also, any rectifier circuit described herein could be a primary rectifier circuit, a secondary rectifier circuit, or an additional rectifier circuit for a solid-state automatic transfer switch with more than two inputs. Also, in some embodiments, any of the rectifier circuits of a solid-state automatic transfer switch may have two legs, three-legs (for example for three-phase power), or more than three legs (for example for multiple power pulses). Also, in some embodiments, any of the rectifier circuits may include all controllable semi-conduct switches, a mix of non-controllable diodes and controllable semi-conductor switches, or all non-controllable diodes, as long as at least one of the rectifier circuits of a given solid-state automatic transfer switch includes controllable semi-conductor switches.

Figure 8:
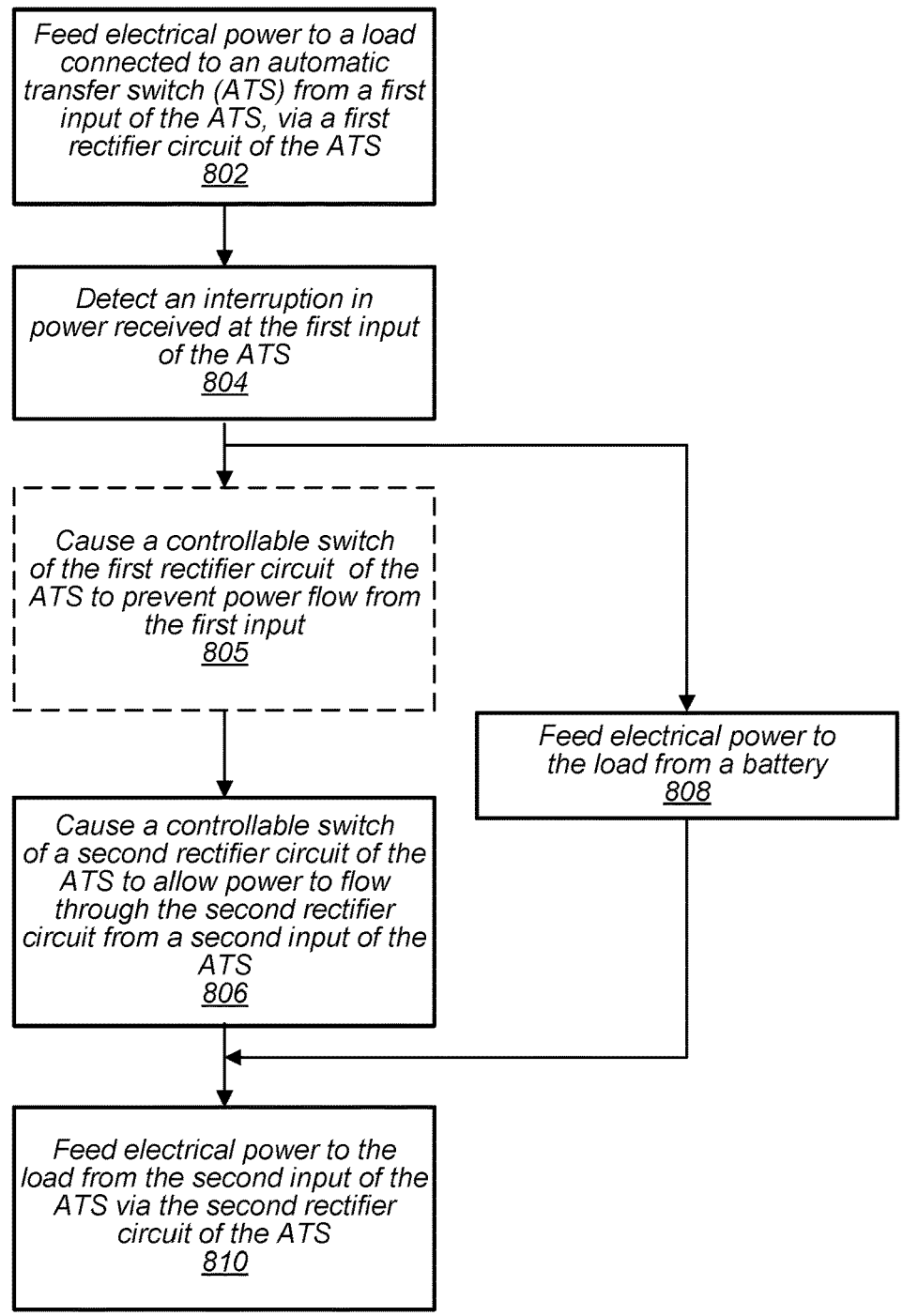
FIG. 8 is a process diagram for providing electrical power to an electrical load via a solid-state automatic transfer switch, according to some embodiments.

FIG. 8 is a process diagram for providing electrical power to an electrical load via a solid-state automatic transfer switch, according to some embodiments. The processes described in FIGS. 8-11 may be performed using any of the solid-state automatic transfer switches described in regard to FIGS. 1-7.

At 802 electrical power is fed to a load connected to a solid-state automatic transfer switch from a primary input of the solid-state automatic transfer switch via a primary rectifier circuit of the solid-state automatic transfer switch. For example alternating current (AC) power may be received at a primary input of a solid-state automatic transfer switch, converted into DC power via a primary rectifier circuit of the solid-state automatic transfer switch and fed from an outlet of the primary rectifier circuit to an output of the solid-state automatic transfer switch via a DC power bus of the solid-state automatic transfer switch.

At 804, an interruption in power received at the primary input of the solid-state automatic transfer switch is detected. For example, a controller of a solid-state automatic transfer switch may detect a change in voltage, current, phase, frequency, or other attribute of power received at a primary input of a solid-state automatic transfer switch and determine the power at the primary power input is interrupted. In some embodiments, a controller may detect an interruption in power received at a primary input based on one or more attributes of the received power falling below a threshold value or deviating from an expected range. In some embodiments, a controller may monitor a deviation in received power for a longer period of time than previous mechanical-based automatic transfer switches before determining a power interruption event has occurred.

At 805, a controller of a solid-state automatic transfer switch may cause a controllable semi-conductor switch of a primary rectifier circuit to prevent power flow from the primary input of the solid-state automatic transfer. In some embodiments, a primary rectifier circuit of a solid-state automatic transfer switch may not include a controllable semi-conductor switch, and 805 may be omitted. For example, when electrical power is interrupted there may not be a need to prevent electrical power from flowing through a primary rectifier circuit by changing a control state of a controllable semi-conductor switch because there is not any power being received at the primary input of the solid-state automatic transfer switch. However, in other embodiments, it may be desirable to prevent electrical power from flowing through a primary rectifier circuit while feeding electrical power from a secondary input via a secondary rectifier circuit. For example, in some situations degraded power may be being received at a primary input that is below a threshold value or outside an excepted range. The degraded power may interfere with power being fed from a secondary input via a secondary rectifier circuit. For example the degraded power may introduce pulses or resonance into the power being fed via the secondary rectifier circuit. Thus, in some embodiments, it may be desirable to further include controllable semi-conductor switches in a primary rectifier circuit to prevent electrical power flow when feeding electrical power from a secondary input via a secondary rectifier circuit.

At 806, based on detecting an interruption in power received at a primary input, a controller may cause a controllable semi-conductor switch of a secondary rectifier circuit of the solid-state automatic transfer switch to allow power to flow through the controllable semi-conductor switch and the secondary rectifier circuit such that electrical power is fed from a secondary input of the solid-state automatic transfer switch to an outlet of the automatic transfer switch via the secondary rectifier circuit of the solid-state automatic transfer switch. In some embodiments, a solid-state automatic transfer switch may further include a reserve power source, such as a battery. Also, in some embodiments, a reserve power source, such as a battery, may be connected to a DC power distribution system downstream of a solid-state automatic transfer switch. At 808, electrical power may be fed from a battery while a controller is determining an interruption event and causing a controllable semi-conductor switch of a secondary rectifier to allow power to flow from a secondary input of the solid-state automatic transfer switch to an output of the solid-state automatic transfer switch. In some embodiments, a battery may not be included in a solid-state automatic transfer switch or downstream of a solid-state automatic transfer switch and 808 may be omitted. In some embodiments, a battery may also provide power while a semi-conductor switch of a primary power rectifier circuit is causing power to not flow through the primary rectifier circuit. In some embodiments, a solid-state automatic transfer switch may be configured to break a flow of power from a current power input before making power flow from another power input. For example, a power flow from a primary input may be broken before a power flow from a secondary input is made.

At 810 electrical power is fed to a load coupled to an output of the solid-state automatic transfer switch from the secondary input of the solid-state automatic transfer switch via the secondary rectifier circuit of the automatic transfer switch.

Figure 9:
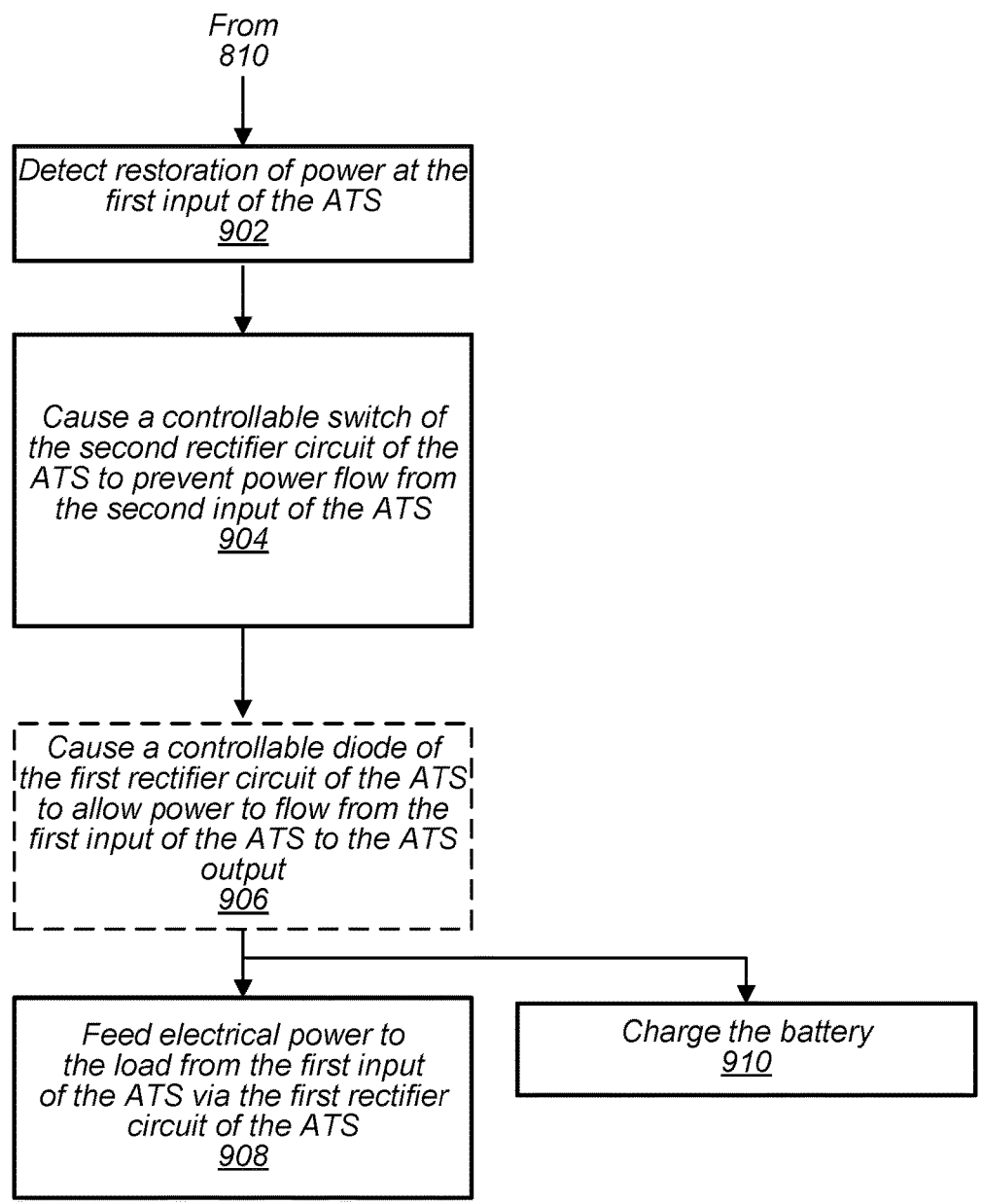
FIG. 9 is a process diagram for providing electrical power to an electrical load via a solid-state automatic transfer switch, according to some embodiments.

FIG. 9 is a process diagram for providing electrical power to an electrical load via a solid-state automatic transfer switch, according to some embodiments. At 902 restoration of electrical power is detected at a primary input of the solid-state automatic transfer switch. For example, 902 may take place after 810 described in FIG. 8. It may be that the power that was interrupted at 804 has been restored at 902.

At 904 a controllable semi-conductor switch of the secondary rectifier circuit of the solid-state automatic transfer switch may be controlled by a controller of the solid-state automatic transfer switch such that the controllable semi-conductor switch changes from a first control state, which allows electrical power to flow through the controllable semi-conductor switch, to a second control state, which prevents electrical power from flowing through the controllable semi-conductor switch. Thus, electrical power may be prevented from flowing from the secondary input of the solid-state automatic transfer switch to the output via the secondary rectifier circuit of the solid-state automatic transfer switch.

In embodiments that include controllable semi-conductor switches in a primary rectifier circuit, at 906 the controllable semi-conductor switches of the primary rectifier circuit may be controlled by a controller of the solid-state automatic transfer switch to change to a control state in which electrical power is allowed to flow through the controllable semi-conductor switches and therefore allowed to flow from the primary input to the output via the primary rectifier circuit. In some embodiments, a primary rectifier circuit may not include controllable semi-conductor switches and electrical power may automatically flow through the primary rectifier circuit when electrical power is restored at the primary input of the solid-state automatic transfer switch coupled to the primary rectifier circuit.

At 908 electrical power is fed to the load coupled to the output of the solid-state automatic transfer switch from the primary input of the solid-state automatic transfer switch and via the primary rectifier circuit of the automatic transfer switch. Also, in some embodiments that include batteries in the solid-state automatic transfer switch or downstream of the solid-state automatic transfer switch, at 910 the batteries may be charged.

In some embodiments, it may be desirable to override a solid-state automatic transfer switch such that the solid-state automatic transfer switch switches to feed electrical power from an opposite one of the primary input or the secondary input despite no interruption event being detected in power received from the primary input or the secondary input. For example, a facility operator may need to perform maintenance on a component of a primary power system and may need to switch to feed electrical power from a reserve power system in order to perform maintenance on the component of the primary power system. In some situations, the facility operator may desire to switch over to the reserve power system while power is still being fed from the primary power system. In order to cause such a switchover, the operator may engage an override feature of a solid-state automatic transfer switch.

Figure 10:
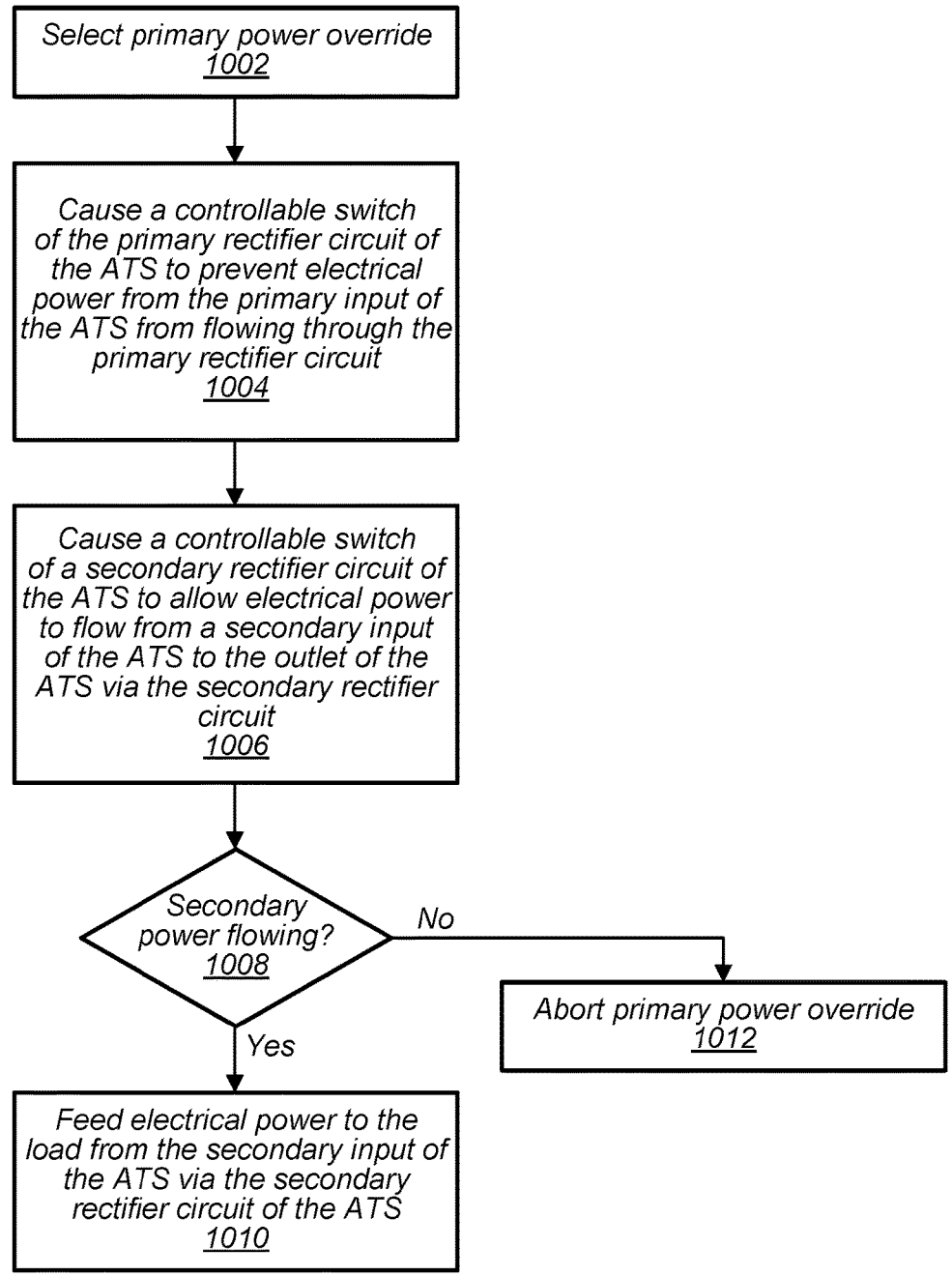
FIG. 10 is a process diagram for causing a solid-state automatic transfer switch to operate in an override mode, according to some embodiments.

FIG. 10 is a process diagram for causing a solid-state automatic transfer switch to operate in an override mode wherein electrical power is fed from a secondary power input, according to some embodiments. At 1002 a primary power override is selected. For example the primary power override may be a user interface element on a solid-state automatic transfer switch such as a button, knob, lever, display, etc. In some embodiments, an override may be operated remotely, either via a wired connection to a solid-state automatic transfer switch or wirelessly.

At 1004, a controller of the solid-state automatic transfer switch may cause a controllable semi-conductor switch of the primary rectifier circuit to prevent electrical power from flowing through the controllable semi-conductor switch thus stopping electrical power flow from the primary input via the primary rectifier circuit.

At 1006 the controller of the solid-state automatic transfer switch causes a controllable semi-conductor switch of a secondary rectifier circuit to allow electrical power from a secondary input of the solid-state automatic transfer switch to flow to an outlet of the solid-state automatic transfer switch via a secondary rectifier circuit of the solid-state automatic transfer switch. At 1008, the controller may verify that power is flowing from the secondary input. At 1012, in response to determining power is not flowing from the secondary input, the controller may abort the power override and revert to feed electrical power from the primary input.

At 1010, the solid-state automatic transfer switch may feed electrical power to the load coupled to the outlet of the solid-state automatic transfer switch from the secondary input via the secondary rectifier circuit.

While FIG. 10 was described in the context of overriding a primary power input while power is available at the primary power input to instead feed electrical power from a secondary power input, a similar process may be followed to override a secondary power input while power is available at the secondary power input and instead feed electrical power from a primary power input.

Figure 11:
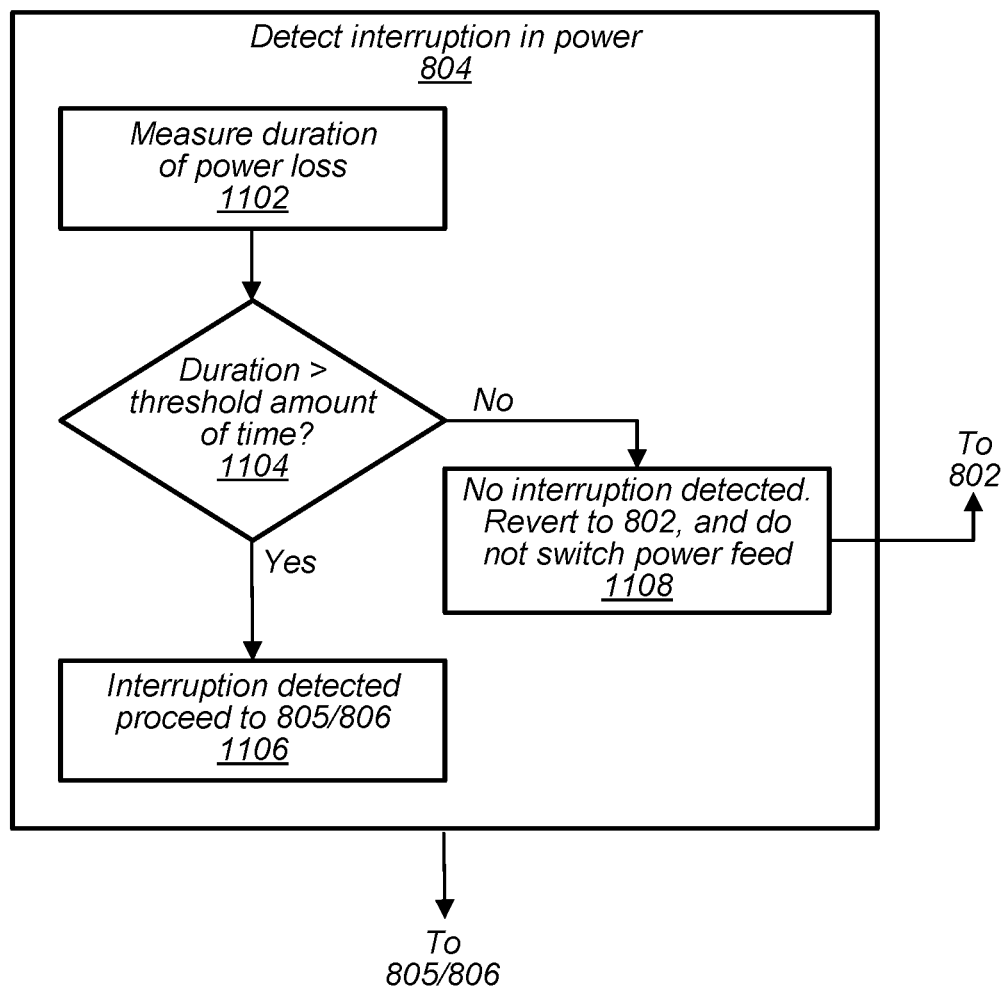
FIG. 11 is a process diagram for detecting an interruption in power from a power source, according to some embodiments.

FIG. 11 is a process diagram for detecting an interruption in power from a power system, according to some embodiments. The steps described in FIG. 11 may be performed by a controller as part of detecting an interruption in power, such as in 804 in FIG. 8.

At 1102, a duration of a power loss at a power input is measured. At 1104, it is determined if the duration of the power loss exceeds a threshold amount of time. If it is determined that the threshold has been exceeded, then at 1106 an interruption is detected and the process proceeds to 805 or 806, depending on whether the solid-state automatic transfer switch includes a controllable primary rectifier circuit. If the threshold amount of time is not exceeded, then the process goes to 1108. At 1108 it is determined that an interruption event has not been detected. The process then reverts back to 802 and continues to feed electrical power from the current power source.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A system, comprising:
   a primary power system electrically coupled to a solid-state automatic transfer switch (ATS) and configured to feed electrical power to a primary input of the solid-state ATS from a primary power source;
   a reserve power system electrically coupled to the solid-state ATS and configured to feed electrical power to a secondary input of the solid-state ATS from a reserve power source;
   the solid-state ATS, wherein the solid-state ATS comprises:
      a primary rectifier circuit electrically coupled to the primary input and electrically coupled to an output of the solid-state ATS; and
      a secondary rectifier circuit electrically coupled to the secondary input and electrically coupled to the output of the solid-state ATS;
      wherein:
         the primary rectifier circuit comprises a particular controllable semi-conductor switch that is directly coupled to the primary input, the particular controllable semi-conductor switch configured to selectively allow or prevent a flow of electrical power through the particular controllable semi-conductor switch, based on a control state of the particular controllable semi-conductor switch; or
         the secondary rectifier circuit comprises a different controllable semi-conductor switch that is directly coupled to the secondary input, the different controllable semi-conductor switch configured to selectively allow or prevent the flow of electrical power through the different controllable semi-conductor switch, based on a control state of the different controllable semi-conductor switch; and
   an electrical load electrically coupled to the output of the solid-state ATS,
   wherein the solid-state ATS is configured to control the control state of the particular controllable semi-conductor switch, or to control the control state of the different controllable semi-conductor switch, to selec- tively feed electrical power to the electrical load from the primary power source or the reserve power source.

2. The system of claim 1, further comprising:
a direct current (DC) power bus electrically coupled to the output of the solid-state ATS; and
a battery electrically coupled to the DC power bus.

3. The system of claim 2, wherein the electrical load comprises a DC power supply configured to receive DC power from the DC power bus.

4. The system of claim 1, wherein the primary rectifier circuit and the secondary rectifier circuit each comprises a respective controllable semi-conductor switch configured to selectively allow or prevent the flow of electrical power through the respective controllable semi-conductor switch.

5. An automatic transfer switch, comprising:
a primary rectifier circuit electrically coupled to a primary input of the automatic transfer switch; and
a secondary rectifier circuit electrically coupled to a secondary input of the automatic transfer switch;
wherein:
the primary rectifier circuit comprises a particular controllable semi-conductor switch that is directly coupled to the primary input, the particular controllable semi-conductor switch configured to selectively allow or prevent the flow of electrical power through the particular controllable semi-conductor switch, based on a control state of the particular controllable semi-conductor switch; or
the secondary rectifier circuit comprises a different controllable semi-conductor switch that is directly coupled to the secondary input, the different controllable semi-conductor switch configured to selectively allow or prevent the flow of electrical power through the different controllable semi-conductor switch, based on a control state of the different controllable semi-conductor switch,
wherein the automatic transfer switch is configured to:
control the control state of the particular controllable semi-conductor switch to selectively feed electrical power to an outlet of the automatic transfer switch from the primary input, or
control the control state of the different controllable semi-conductor switch to selectively feed electrical power to the outlet of the automatic transfer switch from the secondary input.

6. The automatic transfer switch of claim 5,
wherein the primary rectifier circuit or the secondary rectifier circuit is configured to provide full-wave rectification, and
wherein the primary rectifier circuit or the secondary rectifier circuit comprises a non-controllable diode.

7. The automatic transfer switch of claim 5, wherein the primary rectifier circuit and the secondary rectifier circuit each comprise a respective controllable semi-conductor switch.

8. The automatic transfer switch of claim 5, wherein the controllable semi-conductor switch comprises a silicon-controlled rectifier (SCR) diode, a silicon-controlled switch (SCS), or a metal-oxide-semiconductor field-effect transistor (MOSFET).

9. The automatic transfer switch of claim 5, further comprising a direct current (DC) bus coupled to the primary rectifier circuit, the secondary rectifier circuit, and the output of the automatic transfer switch, wherein the automatic transfer switch is configured to feed DC electrical power to electrical loads electrically coupled to the output of the automatic transfer switch.

10. The automatic transfer switch of claim 9, further comprising a battery coupled to the DC bus, wherein the battery is configured to provide electrical power to the electrical loads during a period of time in which power being fed to the output is being switched from being fed from the primary input or from being fed from the secondary input.

11. The automatic transfer switch of claim 9, wherein the primary rectifier circuit and the secondary rectifier circuit each comprise:
two diodes coupled to a positive terminal of the DC bus; and
two diodes coupled to a negative terminal of the DC bus.

12. The automatic transfer switch of claim 11, wherein two of the diodes of the secondary rectifier circuit comprise controllable semi-conductor switches configured to selectively allow or prevent the flow of electrical power through the diodes.

13. The automatic transfer switch of claim 12, wherein two of the diodes of the primary rectifier circuit comprise controllable semi-conductor switches configured to selectively allow or prevent the flow of electrical power through the diodes,
wherein the automatic transfer switch further comprises a controller configured to control a control state of the controllable semi-conductor switches of the primary rectifier circuit and to control a control state of the controllable semi-conductor switches of the secondary rectifier circuit to selectively feed electrical power to an outlet of the automatic transfer switch from the primary input or from the secondary input.

14. The automatic transfer switch of claim 5, wherein the primary rectifier circuit or the secondary rectifier circuit is configured to rectify three-phase electrical power.

15. The automatic transfer switch of claim 5, wherein the controllable semi-conductor switch comprises a silicon-controlled rectifier (SCR) diode, a silicon-controlled switch (SCS), a triode for alternating current (TRIAC), an insulated-gate bipolar transistor (IGBT), or a metal-oxide-semiconductor field-effect transistor (MOSFET).

16. A method, comprising:
feeding electrical power to a load coupled to an output of an automatic transfer switch from a primary power system coupled to a primary input of the automatic transfer switch, wherein the automatic transfer switch comprises:
a primary rectifier circuit electrically coupled to the primary input; and
a secondary rectifier circuit comprising a controllable semi-conductor switch that is directly electrically coupled to a secondary input of the automatic transfer switch;
causing, in response to an interruption in electrical power from the primary power system, the controllable semi-conductor switch of the secondary rectifier circuit to change a control state of the controllable semi-conductor switch such that the controllable semi-conductor switch allows reserve electrical power to flow through the controllable semi-conductor switch to the load coupled to the output of the automatic transfer switch from a reserve power system coupled to the secondary input of the automatic transfer switch.

17. The method of claim 16, further comprising:
causing, while feeding reserve electrical power via the secondary rectifier circuit, a different controllable semi-conductor switch of the primary rectifier circuit to change a control state of the different controllable semi-conductor switch of the primary rectifier circuit such that the different controllable semi-conductor switch prevents electrical power from flowing through the primary rectifier circuit.

18. The method of claim 16, further comprising:

causing, in response to power from the primary power system being restored at the primary input, the controllable semi-conductor switch of the secondary rectifier circuit to change the control state of the controllable semi-conductor switch of the secondary rectifier circuit to prevent reserve electrical power from flowing through the secondary rectifier circuit; and feeding electrical power to the load coupled to the output of the automatic transfer switch from the primary power system.

19. The method of claim 18, further comprising:

causing, in response to an override command, a different controllable semi-conductor switch of the primary rectifier circuit to change a control state of the different controllable semi-conductor switch of the primary rectifier circuit to prevent electrical power from flowing through the primary rectifier circuit.

20. The method of claim 16 further comprising:

feeding electrical power from a battery electrically coupled to a direct current (DC) bus while the automatic transfer switch changes from feeding electrical power from the primary power system to feeding reserve electrical power from the reserve power system, wherein the DC bus is electrically coupled to the outlet of the automatic transfer switch and to the primary and secondary rectifier circuits of the automatic transfer switch.

* * * * *